(12) United States Patent
Dienst et al.

(10) Patent No.: US 12,295,278 B2
(45) Date of Patent: May 13, 2025

(54) TWO ROW AGRICULTURAL PLANTING IMPLEMENT

(71) Applicant: CNH Industrial America LLC, New Holland, PA (US)

(72) Inventors: Johnathon Raymond Dienst, Maple Park, IL (US); Monte Lee DeKam, Westmont, IL (US); Jacob Allan Weis, Bolingbrook, IL (US); Brandon James Kuboushek, New Lenox, IL (US); Mayur Kishorchandra Joshi, Saskatoon (CA); Chad Michael Johnson, Arlington Heights, IL (US); Michael J. Connors, Lockport, IL (US); Brian John Anderson, Yorkville, IL (US)

(73) Assignee: CNH Industrial America LLC, New Holland, PA (US)

(*) Notice: Subject to any disclaimer, the term of this patent is extended or adjusted under 35 U.S.C. 154(b) by 916 days.

(21) Appl. No.: 17/384,289

(22) Filed: Jul. 23, 2021

(65) Prior Publication Data
US 2023/0026107 A1    Jan. 26, 2023

(51) Int. Cl.
    *A01B 73/04*  (2006.01)
    *A01B 63/24*  (2006.01)
    *A01B 73/06*  (2006.01)

(52) U.S. Cl.
    CPC ............ *A01B 73/048* (2013.01); *A01B 63/24* (2013.01); *A01B 73/067* (2013.01)

(58) Field of Classification Search
    CPC ..... A01B 73/048; A01B 63/24; A01B 73/067; A01B 73/04; A01B 73/02; A01B 73/00; A01B 63/14; A01B 63/00; A01B 73/06
    See application file for complete search history.

(56) References Cited

U.S. PATENT DOCUMENTS

| 6,044,916 A | 4/2000 | Hundeby |
| 6,205,937 B1 | 3/2001 | Shoup |

(Continued)

FOREIGN PATENT DOCUMENTS

| WO | 2019123040 | 6/2019 |

OTHER PUBLICATIONS

Screen capture from YouTube video clip entitled "Horsch Product Series: Maestro SV," 1 page, uploaded on Oct. 1, 2020 by user "Horsch North America". Retrieved from Internet: https://www.youtube.com/watch?v=K_vk5DyR9z8.

(Continued)

*Primary Examiner* — Christopher J. Novosad
(74) *Attorney, Agent, or Firm* — Rebecca L. Henkel (57) ABSTRACT

An agricultural planting implement includes a first wing toolbar configured to support a first set of row units. The first wing toolbar is configured to pivotally couple to a main frame of the agricultural planting implement. The agricultural planting implement also includes a second wing toolbar configured to support a second set of row units. In addition, the agricultural planting implement includes a connection assembly having at least one arm pivotally coupling the second wing toolbar to the first wing toolbar. The at least one arm is pivotally coupled to the first wing toolbar and non-pivotally coupled to the second wing toolbar. Furthermore, the connection assembly includes an actuator configured to drive the second wing toolbar to rotate relative to the first wing toolbar.

20 Claims, 4 Drawing Sheets

(56) References Cited

U.S. PATENT DOCUMENTS

| | | |
|---|---|---|
| 6,460,623 B1 | 10/2002 | Knussman et al. |
| 6,675,907 B2 | 1/2004 | Moser et al. |
| 6,701,857 B1 | 3/2004 | Jensen et al. |
| 7,051,663 B2 | 5/2006 | Mever et al. |
| D559,868 S | 1/2008 | Nanawala et al. |
| 7,743,844 B2 | 6/2010 | Kovach et al. |
| D627,373 S | 11/2010 | Prickel et al. |
| D629,426 S | 12/2010 | Prickel et al. |
| D629,427 S | 12/2010 | Prickel et al. |
| D631,068 S | 1/2011 | Prickel et al. |
| 8,056,465 B2 | 11/2011 | Carlz |
| 8,176,992 B2 | 5/2012 | Yuen |
| 8,275,525 B2 | 9/2012 | Kowalchuk et al. |
| D680,559 S | 4/2013 | Blunier et al. |
| 8,522,889 B2 | 9/2013 | Adams et al. |
| 8,544,397 B2 | 10/2013 | Bassett |
| 8,544,398 B2 | 10/2013 | Bassett |
| 8,567,517 B2 | 10/2013 | Friggstad et al. |
| 8,573,111 B2 | 11/2013 | Graham et al. |
| 8,727,032 B2 | 5/2014 | Friggstad |
| 8,733,256 B2 | 5/2014 | Kinzenbaw |
| 8,939,095 B2 | 1/2015 | Freed |
| 9,144,189 B2 | 9/2015 | Stoller et al. |
| 9,198,343 B2 | 12/2015 | Mariman et al. |
| D758,458 S | 6/2016 | Anderson et al. |
| D766,333 S | 9/2016 | Anderson et al. |
| 9,554,504 B2 | 1/2017 | Houck |
| 9,675,004 B2 | 6/2017 | Landphair et al. |
| 9,681,601 B2 | 6/2017 | Bassett |
| 9,723,776 B2 | 8/2017 | Sporrer et al. |
| 9,723,778 B2 | 8/2017 | Bassett |
| 9,814,172 B2 | 11/2017 | Achen et al. |
| 9,879,702 B2 | 1/2018 | Stoller et al. |
| 9,883,623 B2 | 2/2018 | Koch et al. |
| 9,883,626 B2 | 2/2018 | Heim et al. |
| D813,914 S | 3/2018 | Horsch |
| D813,915 S | 3/2018 | Horsch |
| 9,936,624 B2 | 4/2018 | Nininger |
| 9,968,030 B2 | 5/2018 | Kowalchuk et al. |
| 10,045,474 B2 | 8/2018 | Bachman et al. |
| 10,126,073 B2 | 11/2018 | Agner et al. |
| D835,161 S | 12/2018 | Blackwell |
| 10,143,128 B2 | 12/2018 | Landphair et al. |
| 10,149,424 B2 | 12/2018 | Maust et al. |
| D847,212 S | 4/2019 | Dienst et al. |
| 10,251,333 B2 | 4/2019 | Bassett |
| D849,801 S | 5/2019 | Dienst et al. |
| 10,349,571 B2 | 7/2019 | Fink et al. |
| 10,412,877 B2 | 9/2019 | Barrick et al. |
| 10,426,073 B2 | 10/2019 | Totten et al. |
| 10,477,753 B2 | 11/2019 | Achen et al. |
| 10,512,202 B2 | 12/2019 | Adams et al. |
| 10,537,055 B2 | 1/2020 | Gresch et al. |
| 10,548,260 B2 | 2/2020 | Bassett |
| D880,534 S | 4/2020 | Kuboushek et al. |
| D880,535 S | 4/2020 | Dienst et al. |
| 10,617,057 B2 | 4/2020 | Connell et al. |
| D884,750 S | 5/2020 | Leeb |
| 10,645,865 B2 | 5/2020 | Bassett |
| D900,885 S | 11/2020 | Kuboushek et al. |
| 10,820,476 B2 | 11/2020 | Stoller et al. |
| D958,196 S | 7/2022 | Mariman et al. |
| 11,399,453 B2 | 8/2022 | Preimess et al. |
| 2006/0021768 A1 | 2/2006 | Ankenman |
| 2006/0090910 A1 | 5/2006 | Houck |
| 2007/0163791 A1 | 7/2007 | Meek |
| 2009/0178600 A1 | 7/2009 | Horn et al. |
| 2009/0199750 A1 | 8/2009 | Rice et al. |
| 2009/0229501 A1 | 9/2009 | Jaime et al. |
| 2010/0126743 A1 | 5/2010 | Poole et al. |
| 2010/0126744 A1 | 5/2010 | Poole |
| 2012/0175138 A1 | 7/2012 | Friggstad |
| 2013/0032362 A1 | 2/2013 | Rylander |
| 2013/0233580 A1 | 9/2013 | Kinzenbaw |
| 2015/0150185 A1 | 6/2015 | Houck |
| 2015/0271985 A2 | 10/2015 | Stoller et al. |
| 2016/0309641 A1 | 10/2016 | Tauton et al. |
| 2017/0208733 A1 | 7/2017 | Sterchi |
| 2018/0325021 A1 | 11/2018 | Connell et al. |
| 2019/0029165 A1 | 1/2019 | Leimkeuhler et al. |
| 2019/0072114 A1 | 3/2019 | Myers et al. |
| 2019/0183036 A1 | 6/2019 | Leimkeuhler et al. |
| 2019/0373797 A1 | 12/2019 | Schoeny et al. |
| 2020/0068778 A1 | 3/2020 | Schoeny et al. |
| 2020/0084951 A1 | 3/2020 | Fanshier et al. |
| 2020/0093052 A1 | 3/2020 | Preimess et al. |
| 2020/0288620 A1 | 9/2020 | Chwialkowski |
| 2020/0404837 A1 | 12/2020 | Thompson et al. |

OTHER PUBLICATIONS

U.S. Appl. No. 29/800,851, filed Jul. 23, 2021, Johnathon Raymond Dienst.

U.S. Appl. No. 29/800,811, filed Jul. 23, 2021, Johnathon Raymond Dienst.

U.S. Appl. No. 29/800,795, filed Jul. 23, 2021, Johnathon Raymond Dienst.

U.S. Appl. No. 17/389,439, filed Jul. 30, 2021, Jacob Allen Weis.

Office Action, U.S. Appl. No. 17/389,439, dated Mar. 21, 2024.

Office Action, U.S. Appl. No. 17/389,439, dated Jul. 25, 2024.

TWO ROW AGRICULTURAL PLANTING IMPLEMENT

BACKGROUND

The present disclosure relates generally to a two row agricultural planting implement.

Generally, agricultural planting implements (e.g., planters) are towed behind a tractor or other work vehicle via a mounting bracket secured to a rigid frame of the implement. Planting implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. An agricultural product conveying system (e.g., seed tube or powered agricultural product conveyor) is configured to deposit seeds and/or other agricultural products (e.g., fertilizer) into the trench. The opener/agricultural product conveying system is followed by closing discs that move displaced soil back into the trench and/or a packer wheel that packs the soil on top of the deposited seeds/other agricultural products.

Planting implements typically include at least one toolbar configured to support the row units. For example, certain planting implements have a left wing toolbar and a right wing toolbar. Each wing toolbar may be pivotally coupled to a main frame, and each wing toolbar may support multiple row units. For example, the row units may be distributed along a length of each wing toolbar. During planting operations, the left and right wing toolbars may be oriented substantially perpendicularly to a direction of travel of the planting implement. In addition, the left and right wing toolbars may be folded forwardly to a transport position to reduce the width of the planting implement for transport. Unfortunately, due to the width of each row unit, the spacing between row units arranged along the length of each wing toolbar may be limited, thereby limiting the spacing between rows of deposited seeds/other agricultural product.

BRIEF DESCRIPTION

In certain embodiments, an agricultural planting implement includes a first wing toolbar configured to support a first set of row units. The first wing toolbar is configured to pivotally couple to a main frame of the agricultural planting implement. The agricultural planting implement also includes a second wing toolbar configured to support a second set of row units. In addition, the agricultural planting implement includes a connection assembly having at least one arm pivotally coupling the second wing toolbar to the first wing toolbar. The at least one arm is pivotally coupled to the first wing toolbar and non-pivotally coupled to the second wing toolbar. Furthermore, the connection assembly includes an actuator configured to drive the second wing toolbar to rotate relative to the first wing toolbar.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
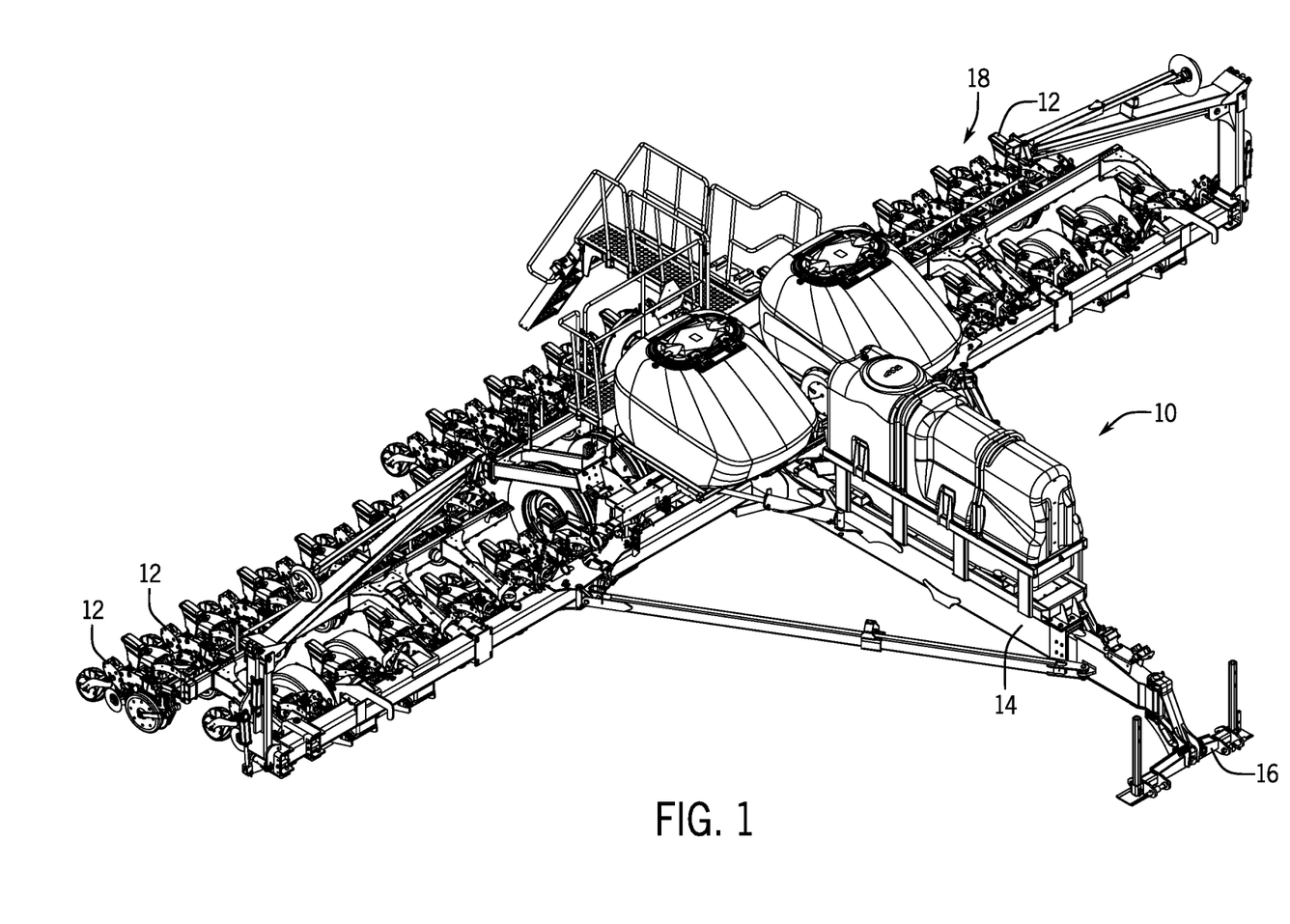
FIG. 1 is a perspective view of an embodiment of an agricultural planting implement having multiple row units distributed across a width of the agricultural implement.

FIG. 1 is a perspective view of an embodiment of an agricultural planting implement 10 having multiple row units 12 distributed across a width of the agricultural planting implement 10. The agricultural planting implement 10 is configured to be towed through a field behind a work vehicle, such as a tractor. As illustrated, the agricultural implement 10 includes a main frame 14 and a hitch 16 coupled to the main frame 14. The hitch 16 is configured to couple the agricultural planting implement 10 to an appropriate work vehicle hitch (e.g., three-point hitch, etc.). The main frame 14 is coupled to a toolbar assembly 18, which supports multiple row units 12. Each row unit 12 may include one or more opener discs configured to form a seed path (e.g., trench) within soil of a field. The row unit 12 may also include an agricultural product conveying system (e.g., seed tube or powered agricultural product conveyer) configured to deposit seeds and/or other agricultural product(s) (e.g., fertilizer) into the seed path/trench. In addition, the row unit 12 may include closing disc(s) and/or a packer wheel positioned behind the agricultural product conveying system. The closing disc(s) are configured to move displaced soil back into the seed path/trench, and the packer wheel is configured to pack soil on top of the deposited seeds/other agricultural product(s). While the illustrated agricultural planting implement 10 includes thirty-two row units 12, in other embodiments, the agricultural planting implement may include more or fewer row units (e.g., 12, 16, 23, 24, 31, 48, or more).

Figure 2:
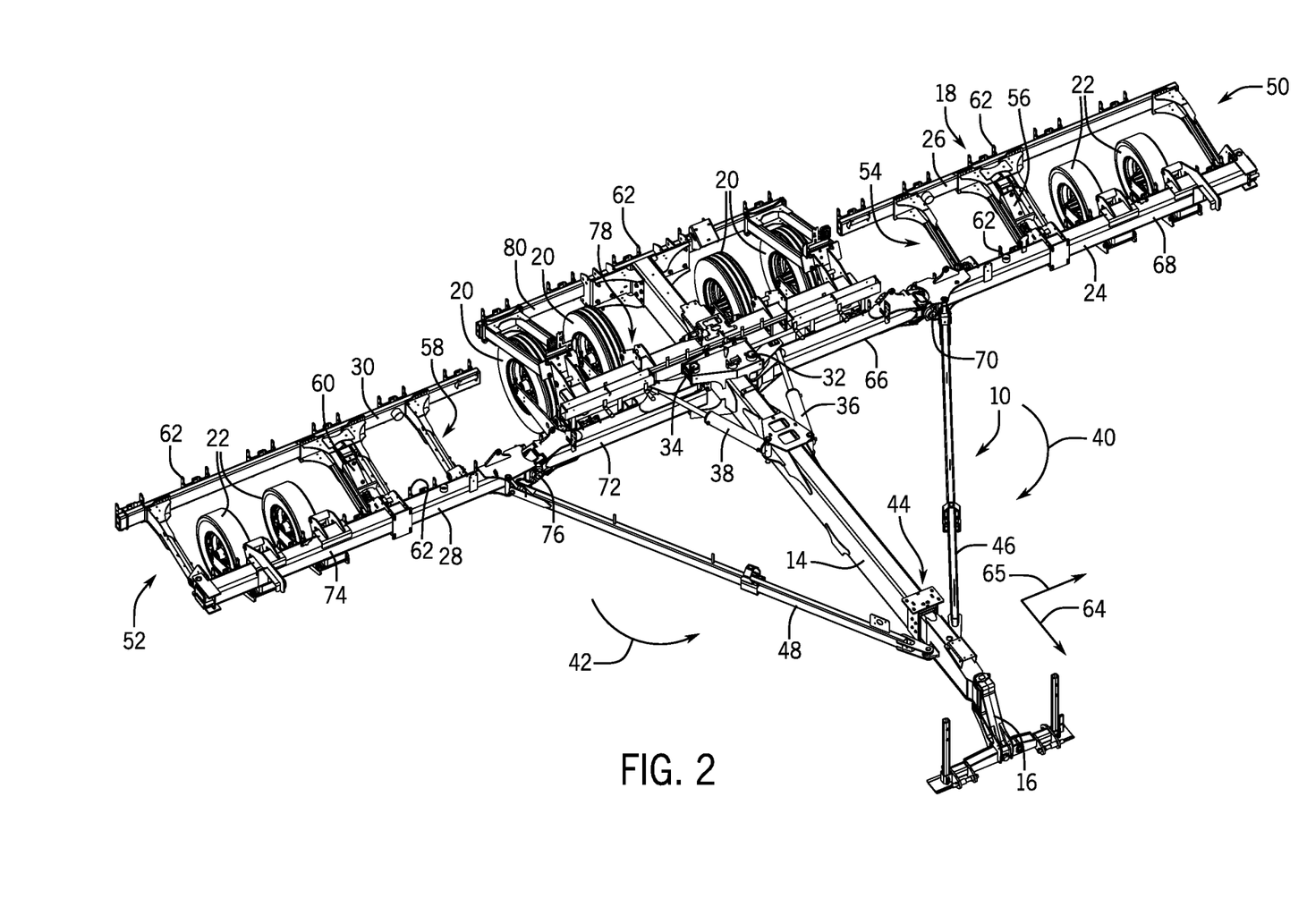
FIG. 2 is a perspective view of a portion of the agricultural planting implement of FIG. 1.

FIG. 2 is a perspective view of a portion of the agricultural planting implement 10 of FIG. 1. In the illustrated embodiment, the agricultural planting implement 10 includes main wheel assemblies 20 and wing wheel assemblies 22. The main wheel assemblies 20 are configured to support a portion of the weight of the toolbar assembly 18, the main frame 14, the row units, agricultural product storage tank(s), agricultural product (e.g., seed, fertilizer, etc.) within the agricultural product storage tank(s), and other components of the agricultural planting implement. In addition, the wing wheel assemblies 22 are configured to support a portion of the weight of the toolbar assembly 18, the row units, and other components of the agricultural planting implement. As illustrated, the agricultural planting implement 10 is in a working configuration. Accordingly, the main wheel assemblies 20 are positioned in a working position, and the wing wheel assemblies 22 are positioned in a working position. As a result, the row units are positioned to engage the soil, thereby enabling the row units to deposit agricultural product (e.g., seed, fertilizer, etc.) within the soil as the agricultural planting implement 10 traverses a field. To transition the agricultural planting implement 10 to a headland turn configuration, the main wheel assemblies 20 may be lowered relative to the main frame 14 to a headland turn position, and the wing wheel assemblies 22 may be lowered relative to the toolbar assembly 18 to a headland turn position, thereby driving the row units to disengage the soil. The agricultural planting implement 10 may then complete a headland turn, and the main wheel assemblies 20 and the wing wheel assemblies 22 may be returned to the respective working positions, thereby enabling planting operations to continue.

To transition the agricultural planting implement 10 to a transport configuration (e.g., for moving the agricultural planting implement between fields, for moving the agricultural planting implement to a storage area, etc.), the main wheel assemblies 20 and the wing wheel assemblies 22 may be transitioned to the respective headland turn positions, thereby disengaging the row units from the soil. The wing toolbars of the toolbar assembly 18 may then be folded forwardly, as discussed in detail below. As the wing toolbars of the toolbar assembly 18 fold forwardly, the wing wheel assemblies 22 support the wing toolbars. Once the wing toolbars of the toolbar assembly 18 are folded forwardly, the main wheel assemblies 20 may be lowered relative to the main frame 14 to a transport position below the headland turn position, thereby positioning the wing wheel assemblies 22, which are oriented perpendicularly to the direction of travel while the wing toolbars are folded forwardly, above the soil surface. The agricultural planting implement 10 may then be moved to a desired location. The agricultural planting implement includes actuators (e.g., hydraulic actuator(s), electromechanical actuator(s), pneumatic actuator(s), etc.) configured to drive the wheel assemblies between the respective positions.

In the illustrated embodiment, the toolbar assembly 18 includes a first left wing toolbar 24, a second left wing toolbar 26, a first right wing toolbar 28, and a second right wing toolbar 30. The first left wing toolbar 24 is pivotally coupled to the main frame 14 by a left pivot joint 32, and the first right wing toolbar 28 is pivotally coupled to the main frame 14 by a right pivot joint 34. In addition, the agricultural planting implement 10 includes a left wing actuator 36 (e.g., second actuator, second left actuator) extending between the main frame 14 and the first left wing toolbar 24, and the agricultural planting implement 10 includes a right wing actuator 38 (e.g., second actuator, second right actuator) extending between the main frame 14 and the first right wing toolbar 28. The left wing actuator 36 is configured to drive the first left wing toolbar 24 and the second left wing toolbar 26 from the illustrated unfolded position to a folded position along a first forward direction 40. Furthermore, the right wing actuator 38 is configured to drive the first right wing toolbar 28 and the second right wing toolbar 30 from the illustrated unfolded position to a folded position along a second forward direction 42. The wing actuators are also configured to drive the respective wing toolbars from the folded position to the unfolded position. Each wing actuator may include any suitable type(s) of actuator(s), such as hydraulic actuator(s), pneumatic actuator(s), electromechanical actuator(s), other suitable type(s) of actuator(s), or a combination thereof.

In the illustrated embodiment, the main frame 14 includes a telescoping section 44 configured to extend as the wing toolbars are folded forwardly and to retract as the wing toolbars are folded rearwardly. In addition, the agricultural planting implement 10 includes a left support 46 and a right support 48. The left support 46 extends between the main frame 14 and the first left wing toolbar 24, and the right support 48 extends between the main frame 14 and the first right wing toolbar 28. As the left wing actuator 36 drives the first left wing toolbar 24 to rotate in the first forward direction 40 and the right wing actuator 38 drives the first right wing toolbar 28 to rotate in the second forward direction 42, the left support 46 and the right support 48 drive the telescoping section 44 of the main frame 14 to extend (e.g., increasing the distance between the hitch 16 and the main wheel assemblies 20). In addition, as the wing actuators drive the respective wing toolbars to rotate rearwardly, the left support 46 and the right support 48 drive the telescoping section 44 of the main frame 14 to retract (e.g., decreasing the distance between the hitch 16 and the main wheel assemblies 20).

Furthermore, once the wing toolbars are folded forwardly, the second left wing toolbar 26 may be raised from the illustrated working position to a transport position, and the second right wing toolbar 30 may be raised from the illustrated working position to a transport position. In the illustrated embodiment, the second left wing toolbar 26 is pivotally coupled to the first left wing toolbar 24 by a left connection assembly 50, and the second right wing toolbar 30 is pivotally coupled to the first right wing toolbar 28 by a right connection assembly 52. As discussed in detail below, the left connection assembly 50 includes one or more arms 54 (e.g., left arm(s)) pivotally coupling the second left wing toolbar 26 to the first left wing toolbar 24, in which each arm is pivotally coupled to the first left wing toolbar 24 and non-pivotally coupled to the second left wing toolbar 26. In addition, the left connection assembly 50 includes a left actuator 56 configured to drive the second left wing toolbar 26 to rotate relative to the first left wing toolbar 24. Furthermore, the right connection assembly 52 includes one or more arms 58 (e.g., right arm(s)) pivotally coupling the second right wing toolbar 30 to the first right wing toolbar 28, in which each arm is pivotally coupled to the first right wing toolbar 28 and non-pivotally coupled to the second right wing toolbar 30. The right connection assembly 52 also includes a right actuator 60 configured to drive the second right wing toolbar 30 to rotate relative to the first right wing toolbar 28. Accordingly, the left actuator 56 may drive the second left wing toolbar 26 to rotate from the illustrated working position to the transport position, in which the second left wing toolbar 26 is positioned above the first left wing toolbar 24, and the right actuator 60 may drive the second right wing toolbar 30 to rotate from the illustrated working position to the transport position, in which the second right wing toolbar 30 is positioned above the first right wing toolbar 28. Each of the left and right actuators may include any suitable type(s) of actuator(s), such as hydraulic actuator(s), pneumatic actuator(s), electromechanical actuator(s), other suitable type(s) of actuator(s), or a combination thereof.

In the illustrated embodiment, each wing toolbar includes multiple mounts 62, and each mount 62 is configured to couple a respective row unit to the wing toolbar. For example, in certain embodiments, each row unit may be coupled to a respective mount 62 by a linkage assembly that facilitates vertical movement of the row unit relative to the respective mount. With respect to the left wing toolbars, the first left wing toolbar 24 may support a first set of row units, the second left wing toolbar 26 may support a second set of row units, and each set may include multiple row units. In addition, with respect to the right wing toolbars, the first right wing toolbar 28 may support a first set of row units, the second right wing toolbar 30 may support a second set of row units, and each set may include multiple row units. While the second left wing toolbar 26 is in the illustrated working position, the second left wing toolbar 26 is positioned behind the first left wing toolbar 24 along a direction of travel 64 of the agricultural planting implement 10. In addition, while the second right wing toolbar 30 is in the illustrated working position, the second right wing toolbar 30 is positioned behind the first right wing toolbar 28 along the direction of travel 64.

In the illustrated embodiment, the mounts 62 of each first wing toolbar are laterally offset (e.g., offset along a lateral axis 65 perpendicular to the direction of travel 64) from the mounts 62 of the respective second wing toolbar. Accordingly, the row units supported by each first wing toolbar (e.g., first set of row units) are laterally offset from the row units supported by the respective second wing toolbar (e.g., second set of row units). As previously discussed, each row unit may establish a respective row of deposited agricultural product as the agricultural planting implement 10 traverses a field along the direction of travel 64. Because the row units are distributed across the first wing toolbars and the second wing toolbars, the spacing between row units along the lateral axis 65 may be reduced (e.g., as compared to the spacing between row units supported by single wing toolbars). As a result, narrower spacing between rows of deposited agricultural product may be established. For example, the row units of the illustrated agricultural planting implement 10 may be positioned to establish 15-inch or 20-inch row spacing.

In the illustrated embodiment, the first left wing toolbar 24 has a first section 66 and a second section 68. The first section 66 is pivotally coupled to the main frame 14 by the left pivot joint 32, and the second section 68 is pivotally coupled to the first section 66 by a left wing joint 70. The left wing joint 70 enables the second section 68 to rotate relative to the first section 66 about an axis substantially parallel to the direction of travel 64, thereby enabling the first left wing toolbar 24 to follow contours within the field. In the illustrated embodiment, the second left wing toolbar 26 is pivotally coupled to the second section 68 of the first left wing toolbar 24 by the left connection assembly 50. However, in other embodiments, the second left wing toolbar may be pivotally coupled to the first section of the first left wing toolbar by the left connection assembly. While the first left wing toolbar 24 has two sections in the illustrated embodiment, in other embodiments, the first left wing toolbar may include more or fewer sections (e.g., 1, 3, 4, or more) pivotally coupled to one another by respective left wing joint(s). Furthermore, while the second left wing toolbar 26 has a single section in the illustrated embodiment, in other embodiments, the second left wing toolbar may include multiple sections (e.g., pivotally coupled to one another, spaced apart from one another, etc.), and each section of the second left wing toolbar may be pivotally coupled to a respective section of the first left wing toolbar.

Furthermore, in the illustrated embodiment, the first right wing toolbar 28 has a first section 72 and a second section 74. The first section 72 is pivotally coupled to the main frame 14 by the right pivot joint 34, and the second section 74 is pivotally coupled to the first section 72 by a right wing joint 76. The right wing joint 76 enables the second section 74 to rotate relative to the first section 72 about an axis substantially parallel to the direction of travel 64, thereby enabling the first right wing toolbar 28 to follow contours within the field. In the illustrated embodiment, the second right wing toolbar 30 is pivotally coupled to the second section 74 of the first right wing toolbar 28 by the right connection assembly 52. However, in other embodiments, the second right wing toolbar may be pivotally coupled to the first section of the first right wing toolbar by the right connection assembly. While the first right wing toolbar 28 has two sections in the illustrated embodiment, in other embodiments, the first right wing toolbar may include more or fewer sections (e.g., 1, 3, 4, or more) pivotally coupled to one another by respective right wing joint(s). Furthermore, while the second right wing toolbar 30 has a single section in the illustrated embodiment, in other embodiments, the second right wing toolbar may include multiple sections (e.g., pivotally coupled to one another, spaced apart from one another, etc.), and each section of the second right wing toolbar may be pivotally coupled to a respective section of the first right wing toolbar.

In the illustrated embodiment, the main frame 14 includes a first row unit support bar 78 and a second row unit support bar 80. As illustrated, the first row unit support bar 78 is positioned forward of the second row unit support bar 80 along the direction of travel 64. Multiple mounts are coupled to each support bar. Accordingly, the first row unit support bar 78 is configured to support a first set of row units, and the second row unit support bar 80 is configured to support a second set of row units. The row units coupled to the support bars of the main frame 14 may establish respective rows of deposited agricultural product within the field (e.g., between the rows of deposited agricultural product established by the row units supported by the left wing toolbars and the rows of deposited agricultural product established by the row units supported by the right wing toolbars). While the main frame is configured to support multiple row units in the illustrated embodiment, in other embodiments, the main frame may not be configured to support row units.

Figure 3:
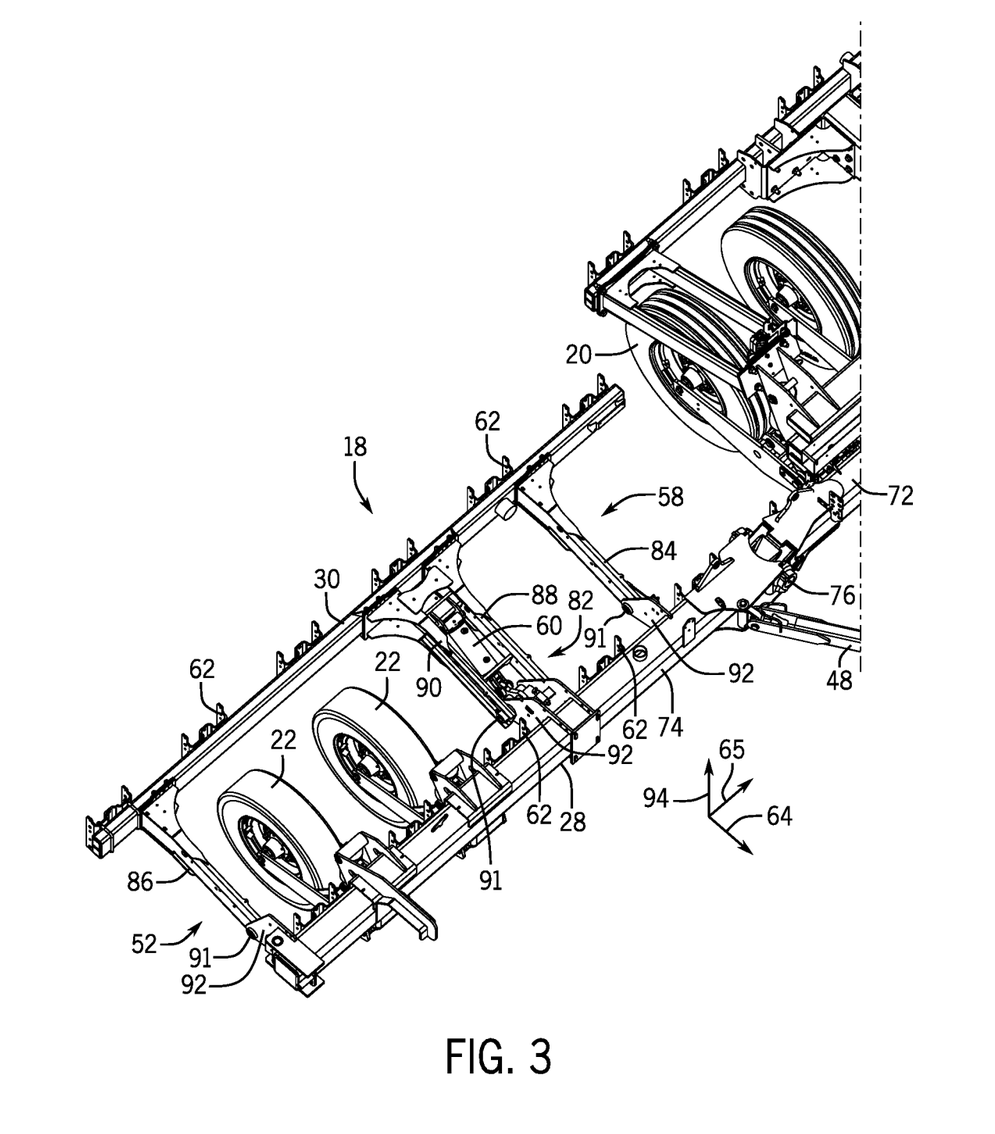
FIG. 3 is a perspective view of a portion of a toolbar assembly of the agricultural planting implement of FIG. 1.

FIG. 3 is a perspective view of a portion of the toolbar assembly 18 of the agricultural planting implement of FIG. 1. As previously discussed, the first right wing toolbar 28 is configured to support a first set of row units, and the first right wing toolbar 28 is pivotally coupled to the main frame by the right pivot joint. In addition, the second right wing toolbar 30 is configured to support a second set of row units, and the second right wing toolbar 30 is positioned behind the first right wing toolbar 28 along the direction of travel 64 while the second right wing toolbar 30 is in the illustrated working position. Furthermore, the agricultural planting implement includes a right connection assembly 52 that pivotally couples the second right wing toolbar 30 to the first right wing toolbar 28. In the illustrated embodiment, the right connection assembly 52 includes multiple arms 58 spaced apart from one another along the length of the first right wing toolbar 28 (e.g., extent of the first right wing toolbar along the lateral axis 65 perpendicular to the direction of travel), and each arm pivotally couples the second right wing toolbar 30 to the first right wing toolbar 28. In addition, each arm is pivotally coupled to the first right wing toolbar 28 and non-pivotally coupled to the second right wing toolbar 30. The right connection assembly 52 also includes an actuator 60 configured to drive the second right wing toolbar 30 to rotate upwardly relative to the first right wing toolbar 28 from the illustrated working position to the transport position. The actuator 60 is also configured to drive the second right wing toolbar 30 downwardly from the transport position to the working position. While the second right wing toolbar 30 is in the transport position, the second right wing toolbar 30 is positioned above the first right wing toolbar 28.

In the illustrated embodiment, the arms 58 of the right connection assembly 52 include a first arm 82 (e.g., first right arm), a second arm 84 (e.g., second right arm), and a third arm 86 (e.g., third right arm). The first arm 82 includes a first support 88 (e.g., first right support) and a second support 90 (e.g., second right support). Each support is pivotally coupled to the first right wing toolbar 28 and non-pivotally coupled to the second right wing toolbar 30. In addition, the right actuator 60 is positioned between the first support 88 and the second support 90 (e.g., along the lateral axis 65). While the first arm 82 includes two supports in the illustrated embodiment, in other embodiments, the first arm may include more or fewer supports (e.g., 1, 3, 4, 5, 6, or more). Furthermore, in the illustrated embodiment, the first arm 82 (e.g., the arm having multiple supports surrounding the actuator) is positioned between the second arm 84 and the third arm 86 along the length of the first right wing toolbar 28 (e.g., along the lateral axis 65). However, in other embodiments, the first arm may be positioned at any other suitable location along the portion of the length of the first right wing toolbar 28 that overlaps the length of the second right wing toolbar 30. In addition, while the right actuator 60 is positioned between the supports of the first arm 82 in the illustrated embodiment, in other embodiments, the right actuator may be positioned at any other suitable location along the portion of the length of the first right wing toolbar 28 that overlaps the length of the second right wing toolbar 30.

In the illustrated embodiment, each arm/support is non-pivotally coupled to the second right wing toolbar 30 by fastener(s). However, in other embodiments, at least one arm/support may be non-pivotally coupled to the second right wing toolbar by any other suitable type(s) of connection(s) (e.g., alone or in combination with the fastener(s)), such as welded connection(s), adhesive connection(s), latch(es), other suitable type(s) of connection(s), or a combination thereof. Furthermore, each arm/support is pivotally coupled to the first right wing toolbar 28 by one or more respective pivot joints 91. Each pivot joint may include one or more bearings, one or more bushings, other suitable component(s), or a combination thereof. In the illustrated embodiment, each arm is pivotally coupled to the first right wing toolbar 28 via a respective arm mount 92, which is non-rotatably coupled to the first right wing toolbar 28. Each arm mount 92 may be non-rotatably coupled to the first right wing toolbar 28 by any suitable type(s) of connection(s) (e.g., fastener(s), welded connection(s), adhesive connection(s), latch(es), other suitable type(s) of connection(s), or a combination thereof). In addition, each arm is pivotally coupled to the respective arm mount 92 via the respective pivot joint(s) 91, thereby pivotally coupling the arm to the first right wing toolbar 28. While each arm is pivotally coupled to the first right wing toolbar via a respective arm mount in the illustrated embodiment, in other embodiments, at least one arm may be directly pivotally coupled to the first right wing toolbar, and/or at least one arm may be pivotally coupled to the first right wing toolbar via another suitable structure.

In the illustrated embodiment, the pivot axis of each arm/support, which is established by the respective pivot joint(s) 91, is positioned at or below the first right wing toolbar 28 along a vertical axis 94. In addition, in certain embodiments, the pivot axis of each arm/support is positioned within the vertical extent of the linkage assemblies (e.g., extent of the linkage assemblies along the vertical axis 94) that couple the first set of row units to the respective mounts 62. Accordingly, each pivot axis is positioned low on the agricultural planting implement (e.g., relative to the extent of the agricultural planting implement along the vertical axis 94). The low pivot axes may reduce the height of the second right wing toolbar 30 and the second set of row units supported by the second right wing toolbar 30 while the second right wing toolbar 30 is in the transport position, thereby increasing the stability of the agricultural planting implement. While the pivot axis of each arm/support is positioned at or below the first right wing toolbar 28 in the illustrated embodiment, in other embodiments, the pivot axis of at least one arm/support may be positioned above the first right wing toolbar along the vertical axis.

In the illustrated embodiment, the right actuator 60 includes a linear actuator (e.g., hydraulic cylinder, pneumatic cylinder, linear electromechanical actuator, etc.) pivotally coupled to the first right wing toolbar 28 and pivotally coupled to the first arm 82. However, in other embodiments, the right actuator may be pivotally coupled to the second right wing toolbar and pivotally coupled to the first arm, or the right actuator may be pivotally coupled to the first right wing toolbar and pivotally coupled to the second right wing toolbar. Furthermore, while the right actuator includes a linear actuator in the illustrated embodiment, in other embodiments, the right actuator may include rotary actuator(s) (e.g., alone or in combination with the linear actuator), such as electric motor(s), hydraulic motor(s), pneumatic motor(s), other suitable type(s) of rotary actuator(s), or a combination thereof. In addition, while linear and rotary actuators are disclosed above, in certain embodiments, the right actuator may include other suitable type(s) of actuator(s).

While the right connection assembly 52 includes three arms in the illustrated embodiment, in other embodiments, the right connection assembly may include more or fewer arms (e.g., 1, 2, 4, 5, 6, or more). For example, in certain embodiments, at least one of the first arm (e.g., the arm having multiple supports surrounding the actuator), the second arm, or the third arm may be omitted. In embodiments in which the first arm is omitted, the actuator may be pivotally coupled to the second arm or the third arm, or the actuator may be pivotally coupled to the first and second right wing toolbars. Furthermore, in certain embodiments, the right connection assembly may include multiple right actuators spaced apart from one another along the length of the first right wing toolbar. For example, in certain embodiments, the right connection assembly may include multiple actuator-surrounding arms, in which each actuator-surrounding arm includes multiple supports surrounding (e.g., disposed on opposite lateral sides of) a respective right actuator. In such embodiments, each support may be pivotally coupled to the first right wing toolbar and non-pivotally coupled to the second right wing toolbar. In addition, in certain embodiments, the right connection assembly may only include actuator-surrounding arm(s).

While the right connection assembly 52 is described above, all of the features and variations disclosed above with regard to the right connection assembly may apply to the left connection assembly. Because the connection assemblies enable the second wing toolbars to be positioned above the first wing toolbars while the agricultural planting implement is in the transport configuration, the width of the agricultural planting implement may be reduced for transport, thereby facilitating movement of the agricultural planting implement (e.g., between fields, to a storage area, etc.). Furthermore, in certain embodiments, the second wing toolbars may be raised to the transport position during maintenance operations to facilitate access to the first sets of row units supported by the first wing toolbars. In addition, because each row unit supported by the toolbar assembly is coupled to a respective toolbar, the mounting process for the row units may be simplified (e.g., as compared to a configuration in which the second sets of row units are coupled to rockshafts configured to move the row units between the working position and the transport position). Furthermore, due to the number and configuration of the arms of each connection assembly, the connection assembly may enhance the lateral stability of the row units (e.g., as compared to a configuration in which each row unit of the second set of row units is individually coupled to a rockshaft configured to move the row units between the working position and the transport position).

Figure 4:
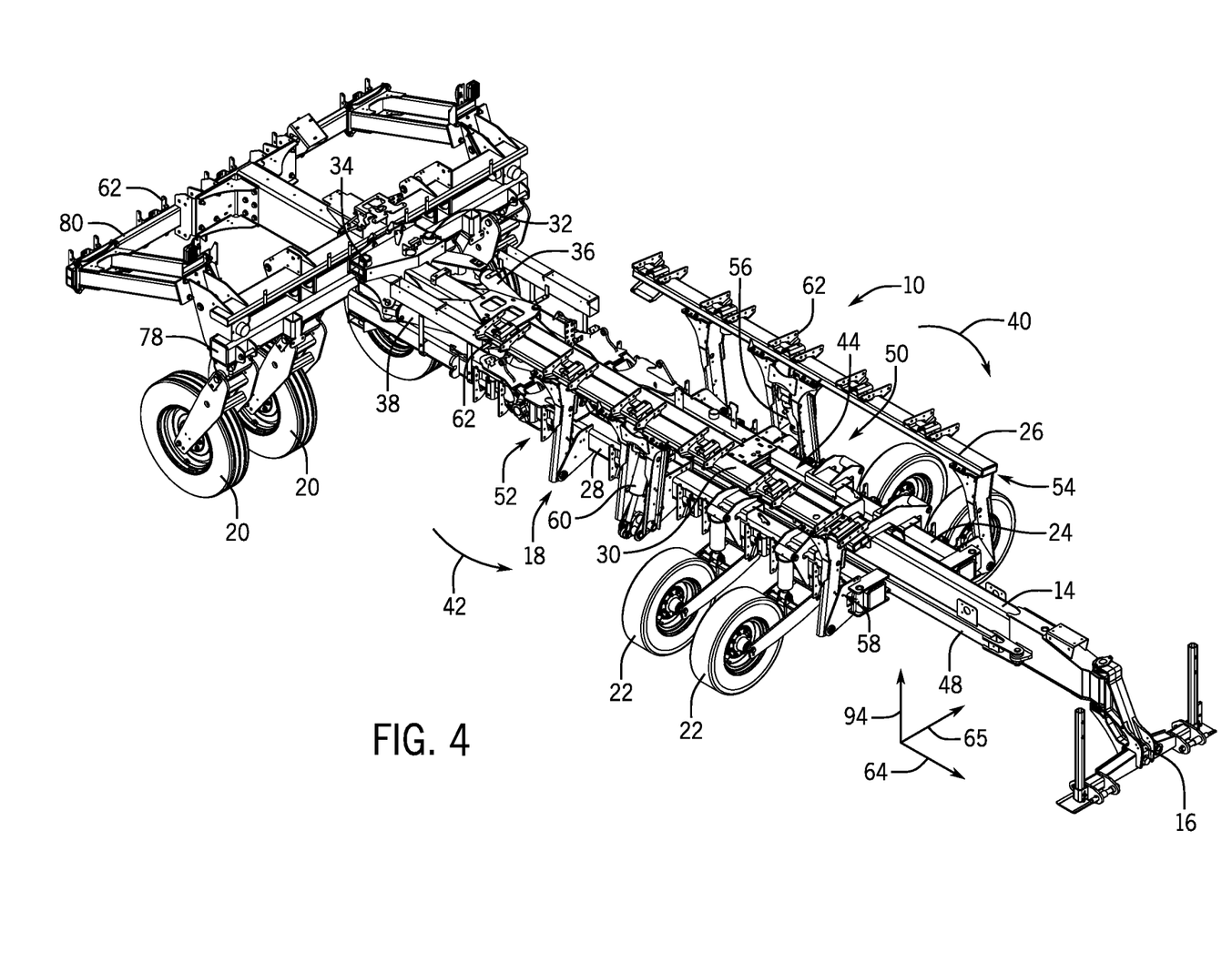
FIG. 4 is a perspective view of a portion of the agricultural planting implement of FIG. 1, in which the agricultural planting implement is in a transport configuration.

FIG. 4 is a perspective view of a portion of the agricultural planting implement 10 of FIG. 1, in which the agricultural planting implement 10 is in the transport configuration. With the agricultural planting implement 10 in the illustrated transport configuration, the main wheel assemblies 20 are lowered to the transport position, the wing toolbars are folded forwardly, and the wing wheel assemblies 22 are oriented perpendicularly to the direction of travel 64 and positioned above the soil surface. In addition, with the wing toolbars of the toolbar assembly 18 folded forwardly, the telescoping section 44 of the main frame 14 is extended. Furthermore, the second left wing toolbar 26 is in the transport position, in which the second left wing toolbar 26 is positioned above the first left wing toolbar 24, and the second right wing toolbar 30 is in the transport position, in which the second right wing toolbar 30 is positioned above the first right wing toolbar 28. Because the second wing toolbars are positioned above the first wing toolbars while the agricultural planting implement is in the transport configuration, the width of the agricultural planting implement may be reduced for transport, thereby facilitating movement of the agricultural planting implement (e.g., between fields, to a storage area, etc.).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural planting implement, comprising:
   a first wing toolbar configured to support a first plurality of row units, wherein the first wing toolbar is configured to pivotally couple to a main frame of the agricultural planting implement;
   a second wing toolbar configured to support a second plurality of row units; and
   a connection assembly, comprising:
      at least one arm pivotally coupling the second wing toolbar to the first wing toolbar, wherein the at least one arm is pivotally coupled to the first wing toolbar via a single respective pivot junction, such that a respective pivotal connection of the at least one arm to the first wing toolbar consists of the single respective pivot junction, and the at least one arm is non-pivotally coupled to the second wing toolbar; and
      an actuator configured to drive the second wing toolbar to rotate relative to the first wing toolbar.

2. The agricultural planting implement of claim 1, wherein the at least one arm comprises a first support and a second support, each support of the first and second supports is pivotally coupled to the first wing toolbar and non-pivotally coupled to the second wing toolbar, and the actuator is positioned between the first support and the second support.

3. The agricultural planting implement of claim 1, wherein the at least one arm comprises a plurality of arms spaced apart from one another along a length of the first wing toolbar.

4. The agricultural planting implement of claim 3, wherein the plurality of arms comprises a first arm and a second arm, the first arm comprises a first support and a second support, each support of the first and second supports is pivotally coupled to the first wing toolbar and non-pivotally coupled to the second wing toolbar, and the actuator is positioned between the first support and the second support.

5. The agricultural planting implement of claim 4, wherein the plurality of arms comprises a third arm, and the first arm is positioned between the second arm and the third arm along the length of the first wing toolbar.

6. The agricultural planting implement of claim 1, wherein the actuator comprises a linear actuator pivotally coupled to the first wing toolbar and pivotally coupled to the at least one arm.

7. The agricultural planting implement of claim 1, comprising a second actuator configured to drive the first wing toolbar to pivot relative to the main frame.

8. An agricultural planting implement, comprising:
   a first left wing toolbar configured to support a first left plurality of row units, wherein the first left wing toolbar is configured to pivotally couple to a main frame of the agricultural planting implement;
   a second left wing toolbar configured to support a second left plurality of row units;
   a left connection assembly, comprising:
      at least one left arm pivotally coupling the second left wing toolbar to the first left wing toolbar, wherein the at least one left arm is pivotally coupled to the first left wing toolbar via a single respective pivot junction, such that a respective pivotal connection of the at least one left arm to the first left wing toolbar consists of the single respective pivot junction, and the at least one left arm is non-pivotally coupled to the second left wing toolbar; and a left actuator configured to drive the second left wing toolbar to rotate relative to the first left wing toolbar;

a first right wing toolbar configured to support a first plurality of row units, wherein the first right wing toolbar is configured to pivotally couple to the main frame of the agricultural planting implement;

a second right wing toolbar configured to support a second right plurality of row units;

a right connection assembly, comprising:

at least one right arm pivotally coupling the second right wing toolbar to the first right wing toolbar, wherein the at least one right arm is pivotally coupled to the first right wing toolbar via a single respective pivot junction, such that a respective pivotal connection of the at least one right arm to the first right wing toolbar consists of the single respective pivot junction, and the at least one right arm is non-pivotally coupled to the second right wing toolbar; and a right actuator configured to drive the second right wing toolbar to rotate relative to the first right wing toolbar.

9. The agricultural planting implement of claim 8, wherein the at least one left arm comprises a first left support and a second left support, each left support of the first and second left supports is pivotally coupled to the first left wing toolbar and non-pivotally coupled to the second left wing toolbar, and the left actuator is positioned between the first left support and the second left support; and wherein the at least one right arm comprises a first right support and a second right support, each right support of the first and second right supports is pivotally coupled to the first right wing toolbar and non-pivotally coupled to the second right wing toolbar, and the right actuator is positioned between the first right support and the second right support.

10. The agricultural planting implement of claim 8, wherein the at least one left arm comprises a plurality of left arms spaced apart from one another along a length of the first left wing toolbar, and the at least one right arm comprises a plurality of right arms spaced apart from one another along a length of the first right wing toolbar.

11. The agricultural planting implement of claim 10, wherein the plurality of left arms comprises a first left arm and a second left arm, the first left arm comprises a first left support and a second left support, each left support of the first and second left supports is pivotally coupled to the first left wing toolbar and non-pivotally coupled to the second left wing toolbar, and the left actuator is positioned between the first left support and the second left support; and wherein the plurality of right arms comprises a first right arm and a second right arm, the first right arm comprises a first right support and a second right support, each right support of the first and second right supports is pivotally couple to the first right wing toolbar and non-pivotally coupled to the second right wing toolbar, and the right actuator is positioned between the first right support and the second right support.

12. The agricultural planting implement of claim 11, wherein the plurality of left arms comprises a third left arm, the first left arm is positioned between the second left arm and the third left arm along the length of the first left wing toolbar, the plurality of right arms comprises a third right arm, and the first right arm is positioned between the second right arm and the third right arm along the length of the first right wing toolbar.

13. The agricultural planting implement of claim 8, wherein the left actuator comprises a linear actuator pivotally coupled to the first left wing toolbar and pivotally coupled to the at least one left arm, and the right actuator comprises a linear actuator pivotally coupled to the first right wing toolbar and pivotally coupled to the at least one right arm.

14. The agricultural planting implement of claim 8, comprising:

a second left actuator configured to drive the first left wing toolbar to pivot relative to the main frame; and a second right actuator configured to drive the first right wing toolbar to pivot relative to the main frame.

15. An agricultural planting implement, comprising:

a first wing toolbar configured to support a first plurality of row units, wherein the first wing toolbar is configured to pivotally couple to a main frame of the agricultural planting implement;

a second wing toolbar configured to support a second plurality of row units, wherein the second wing toolbar is positioned behind the first wing toolbar along a direction of travel of the agricultural planting implement while the second wing toolbar is in a working position and the first wing toolbar is in an unfolded position; and a connection assembly, comprising:

at least one arm pivotally coupling the second wing toolbar to the first wing toolbar, wherein the at least one arm is pivotally coupled to the first wing toolbar via a single respective pivot junction, such that a respective pivotal connection of the at least one arm to the first wing toolbar consists of the single respective pivot junction, and the at least one arm is non-pivotally coupled to the second wing toolbar; and an actuator configured to drive the second wing toolbar to rotate upwardly relative to the first wing toolbar from the working position to a transport position, wherein the second wing toolbar is positioned above the first wing toolbar while the second wing toolbar is in the transport position.

16. The agricultural planting implement of claim 15, wherein the at least one arm comprises a first support and a second support, each support of the first and second supports is pivotally coupled to the first wing toolbar and non-pivotally coupled to the second wing toolbar, and the actuator is positioned between the first support and the second support.

17. The agricultural planting implement of claim 15, wherein the at least one arm comprises a plurality of arms spaced apart from one another along a length of the first wing toolbar.

18. The agricultural planting implement of claim 17, wherein the plurality of arms comprises a first arm and a second arm, the first arm comprises a first support and a second support, each support of the first and second supports is pivotally coupled to the first wing toolbar and non-pivotally coupled to the second wing toolbar, and the actuator is positioned between the first support and the second support.

19. The agricultural planting implement of claim 15, wherein the actuator comprises a linear actuator pivotally coupled to the first wing toolbar and pivotally coupled to the at least one arm.

20. The agricultural planting implement of claim 15, comprising a second actuator configured to drive the first wing toolbar to pivot relative to the main frame.

* * * * *